US012586991B2

(12) United States Patent
Kim et al.

(10) Patent No.: US 12,586,991 B2
(45) Date of Patent: Mar. 24, 2026

(54) FUEL CELL APPARATUS

(71) Applicants: Hyundai Motor Company, Seoul
(KR); Kia Corporation, Seoul (KR)

(72) Inventors: Myung Jin Kim, Yongin (KR); **Ki
Wook Ohm**, Yongin (KR)

(73) Assignees: Hyundai Motor Company, Seoul
(KR); Kia Corporation, Seoul (KR)

( * ) Notice: Subject to any disclaimer, the term of this
patent is extended or adjusted under 35
U.S.C. 154(b) by 284 days.

(21) Appl. No.: 18/141,713

(22) Filed: May 1, 2023

(65) Prior Publication Data

US 2024/0063612 A1    Feb. 22, 2024

(30) Foreign Application Priority Data

Aug. 22, 2022    (KR) ........................ 10-2022-0104760

(51) Int. Cl.
*H02B 1/20*          (2006.01)
*H01M 8/0267*        (2016.01)
*H02B 1/56*          (2006.01)
*H05K 7/20*          (2006.01)
*H01M 8/10*          (2016.01)

(52) U.S. Cl.
CPC ............ *H02B 1/20* (2013.01); *H01M 8/0267*
(2013.01); *H02B 1/56* (2013.01); *H01M
2008/1095* (2013.01); *H01M 2250/20*
(2013.01)

(58) Field of Classification Search
CPC ......... H02B 1/20; H02B 1/56; H01M 8/0267;
H01M 2008/1095; H01M 2250/20
USPC ........................................................ 361/622
See application file for complete search history.

(56) References Cited

U.S. PATENT DOCUMENTS

| | | | | |
|---|---|---|---|---|
| 6,653,008 | B1* | 11/2003 | Hirakata | ........... H01M 8/04029 |
| | | | | 429/434 |
| 9,537,159 | B2* | 1/2017 | Jufuku | ..................... B60K 1/04 |
| 11,252,847 | B2* | 2/2022 | Waddell | ................ H01L 23/427 |
| 12,089,380 | B2* | 9/2024 | Nishimachi | ............ H05K 7/209 |
| 2006/0024542 | A1* | 2/2006 | Uozumi | ............ H01M 8/04014 |
| | | | | 429/513 |
| 2006/0088740 | A1* | 4/2006 | Sakano | ............... H01M 8/0247 |
| | | | | 429/514 |
| 2007/0007060 | A1* | 1/2007 | Ono | ...................... B62D 25/025 |
| | | | | 180/65.31 |
| 2007/0065696 | A1* | 3/2007 | Fukuma | ............ H01M 8/04126 |
| | | | | 429/454 |
| 2010/0116576 | A1* | 5/2010 | Jufuku | ..................... B60K 1/04 |
| | | | | 180/68.5 |

(Continued)

FOREIGN PATENT DOCUMENTS

| | | |
|---|---|---|
| JP | 6354469 B2 | 7/2018 |
| JP | 6691651 B2 | 5/2020 |
| JP | 2021-19472 A | 2/2021 |

*Primary Examiner* — Anatoly Vortman
(74) *Attorney, Agent, or Firm* — Fox Rothschild LLP

(57) ABSTRACT

A fuel cell apparatus of the disclosure includes a fuel cell
and a power distribution unit configured to distribute power
generated in the fuel cell. The power distribution unit
includes a power part and a cooling unit, which is disposed
so as to be in contact with the power part to cool the power
part and includes an inlet port configured to allow cooling
fluid to be introduced thereinto from the outside and an
outlet port configured to discharge the cooling fluid to the
outside. The inlet port and the outlet port are disposed so as
to be oriented from the power distribution unit in the same
direction.

19 Claims, 21 Drawing Sheets

(56)         References Cited

U.S. PATENT DOCUMENTS

2010/0178577 A1 *  7/2010  Morita .............. H01M 8/04302
                                                 429/434
2022/0304185 A1 *  9/2022  Nishimachi ......... H02M 7/5387

* cited by examiner

310G

<u>310I</u>

322                 310

IN                OUT

LOW
TEMPERATURE              HIGH
TEMPERATURE

FUEL CELL APPARATUS

This application claims under 35 U.S.C. § 119(a) the benefit of Korean Patent Application No. 10-2022-0104760, filed on Aug. 22, 2022, which is hereby incorporated by reference as if fully set forth herein.

BACKGROUND

Technical Field

Embodiments of the present disclosure generally relate to a fuel cell apparatus.

Background

Power generated in a fuel cell is transmitted to a power distribution device of a fuel cell system through a terminal block. The power distribution device distributes power transmitted to a bus bar provided therein to peripheral high-voltage parts, thereby driving a fuel cell system.

Depending on the output condition and operation environment of an apparatus equipped with a fuel cell, heat within an allowable operating temperature range may be generated in various high-voltage parts included in the power distribution device. Therefore, the power distribution device includes a heat dissipation pad or a cooling channel, which is provided adjacent to a part generating a great amount of heat in order to radiate heat to the outside. For example, a heat dissipation pad or a cooling channel may be disposed below a diode, which generates a greater amount of heat than any other part of the power distribution device.

However, the entire area of a high-voltage part included in the power distribution device may not be evenly cooled, and thus heat generated in the power distribution device may not be radiated to the outside, which may cause thermal damage to the high-voltage part and resultant reduction in the lifespan of the power distribution device. Therefore, research with the goal of solving this problem is underway.

SUMMARY

Accordingly, embodiments are directed to a fuel cell apparatus that substantially obviates one or more problems due to limitations and disadvantages of the related art.

Embodiments provide a fuel cell apparatus having excellent cooling performance.

However, the objects to be accomplished by the embodiments are not limited to the above-mentioned objects, and other objects not mentioned herein will be clearly understood by those skilled in the art from the following description.

A fuel cell apparatus according to an embodiment may include a fuel cell and a power distribution unit configured to distribute power generated in the fuel cell. The power distribution unit may include a power part and a cooling unit, which is disposed so as to be in contact with the power part to cool the power part and includes an inlet port configured to allow cooling fluid to be introduced thereinto from the outside and an outlet port configured to discharge the cooling fluid to the outside. The inlet port and the outlet port may be disposed so as to be oriented from the power distribution unit in the same direction.

The inlet port and the outlet port may be disposed adjacent to each other.

The fuel cell apparatus may further include a high-voltage connector terminal connected to the power distribution unit, and the outlet port and the inlet port may be located opposite the high-voltage connector terminal.

The high-voltage connector terminal may be disposed so as to be oriented from the power distribution unit in a direction opposite to a direction in which the outlet port and the inlet port are oriented.

The high-voltage connector terminal may be disposed so as to be oriented in the backward direction of the fuel cell apparatus, and the outlet port and the inlet port may be disposed so as to be oriented in the forward direction of the fuel cell apparatus.

The power part may include an electronic element including a diode, a switching unit selectively connecting the fuel cell to the power distribution unit through a terminal block, a bus bar connecting the fuel cell to the terminal block, and a wiring interconnecting at least two of the electronic element, the switching unit, or the bus bar.

At least a portion of the cooling unit may overlap the power part in the vertical direction.

The cooling fluid may be coolant or cooling air.

The cooling unit may further include a main partition wall disposed so as to separate the cooling fluid introduced through the inlet port and the cooling fluid to be discharged through the outlet port from each other.

The cooling unit may include a first space, which allows the cooling fluid introduced into the inlet port to flow therethrough, a second space, which allows the cooling fluid to flow therethrough and to be discharged through the outlet port and is separated from the first space by the main partition wall, and a third space, which forms a path allowing the cooling fluid to move from the first space to the second space. The power part may overlap the first space and the second space in the vertical direction such that a region thereof overlapping the first space is larger than a region thereof overlapping the second space. The first space may be larger than the second space.

The main partition wall may extend in a first direction, which is parallel to the inflow direction of the cooling fluid into the inlet port.

The cooling unit may further include sub-partition walls alternately disposed in a second direction, which intersects the first direction, to form a cooling fluid path in a serpentine shape together with the main partition wall.

The sub-partition walls may be disposed in at least one of the first space or the second space.

The cooling unit may further include a propeller disposed in at least one of the first space, the second space, or the third space to rotate the cooling fluid introduced thereinto through the inlet port.

The cooling unit may further include a plurality of cooling fins disposed in a cooling fluid path in at least one of the first space, the second space, or the third space.

The power distribution unit may further include a main body accommodating the power part, and the cooling unit may be disposed on the lower end of the main body.

As discussed, the method and system suitably include use of a controller or processer.

In another embodiment, vehicles are provided that comprise an apparatus as disclosed herein.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
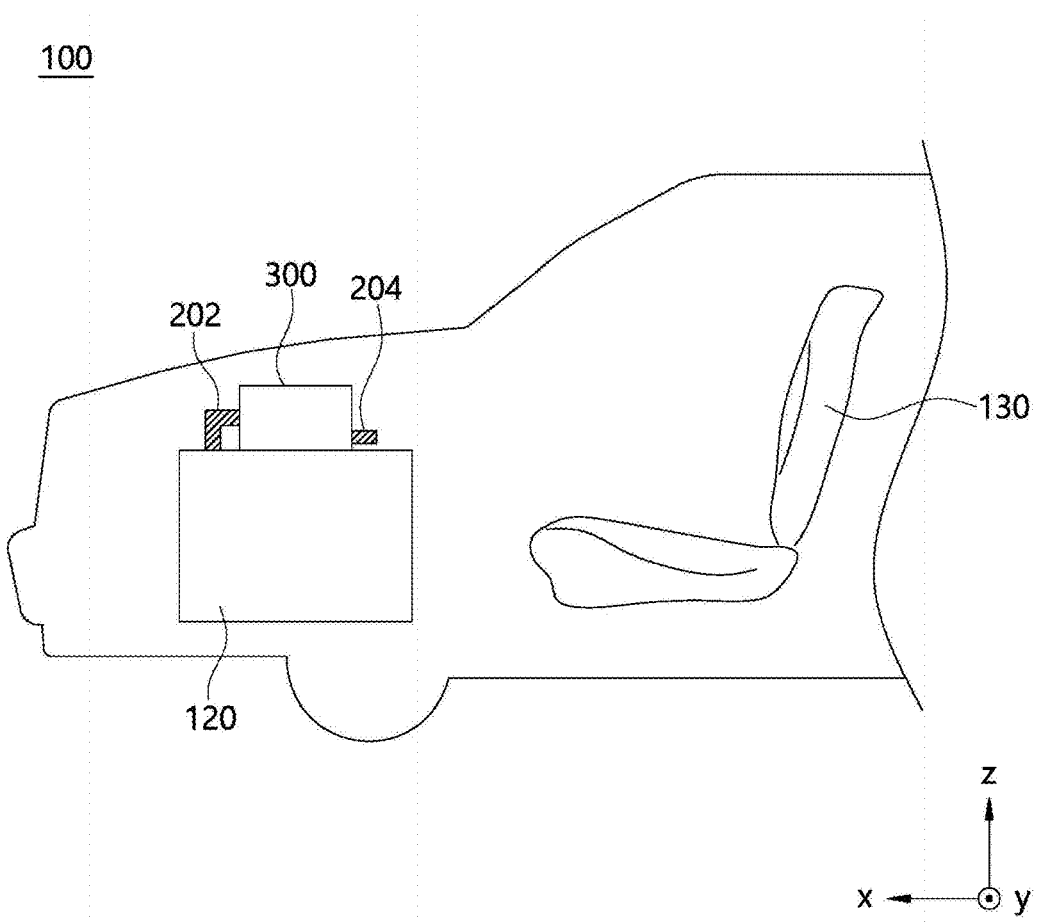
FIG. 1 is a schematic diagram showing the external appearance of a fuel cell apparatus according to an embodiment.

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above", and "under/lower part/below", are used only to distinguish between one subject or element and another subject or element, without necessarily requiring or involving any physical or logical relationship or sequence between the subjects or elements.

Hereinafter, a fuel cell apparatus 100 according to an embodiment will be described with reference to the accompanying drawings. The fuel cell apparatus 100 will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, the x-axis, the y-axis, and the z-axis may intersect each other obliquely.

FIG. 1 is a schematic diagram showing the external appearance of the fuel cell apparatus 100 according to an embodiment.

The fuel cell apparatus 100 shown in FIG. 1 may include a fuel cell 120, a high-voltage connector terminal 204, and a power distribution unit (PDU) (or a high-voltage junction box or a junction box) 300.

When the fuel cell apparatus is a vehicle, the fuel cell 120 may be a polymer electrolyte membrane fuel cell (or a proton exchange membrane fuel cell) (PEMFC), which has been studied most extensively as a power source for driving vehicles. However, the embodiments are not limited to any specific type of fuel cell 120.

The power distribution unit 300 may serve to receive power generated in the fuel cell 120 through a terminal block (not shown) and distribute the power to peripheral high-voltage parts (e.g. a load of a vehicle) for driving the fuel cell apparatus 100 through the high-voltage connector terminal 204.

The power distribution unit 300 and the fuel cell 120 may be located at the center of an engine compartment, which is located in front of a seat 130 in the fuel cell apparatus 100. The power distribution unit 300 may be disposed on the fuel cell 120. However, the embodiments are not limited to any specific position or disposition pattern of the power distribution unit 300.

Figure 2A:
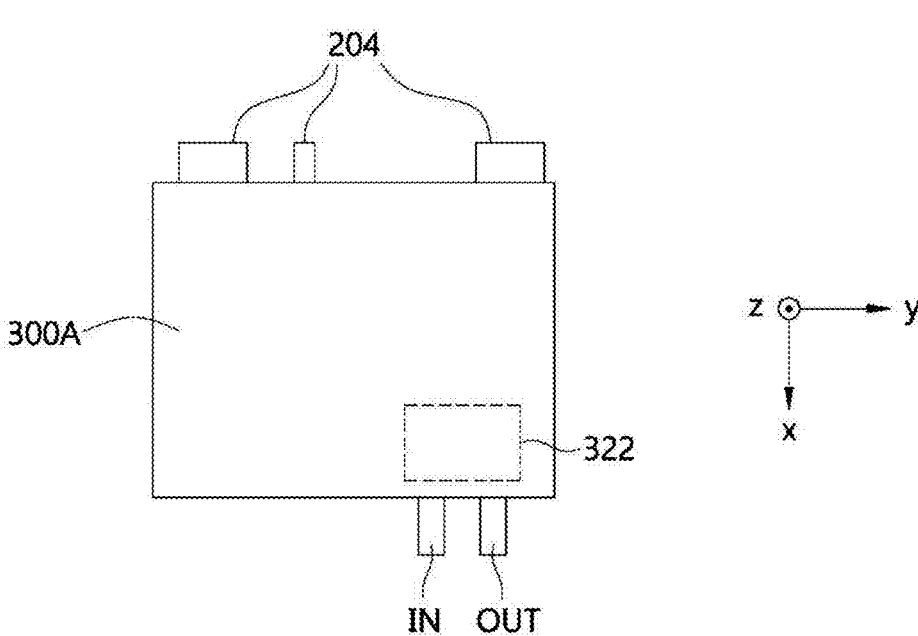
FIGS. 2A and 2B are respectively a plan view and a bottom view of a power distribution unit according to an embodiment.
Figure 2B:
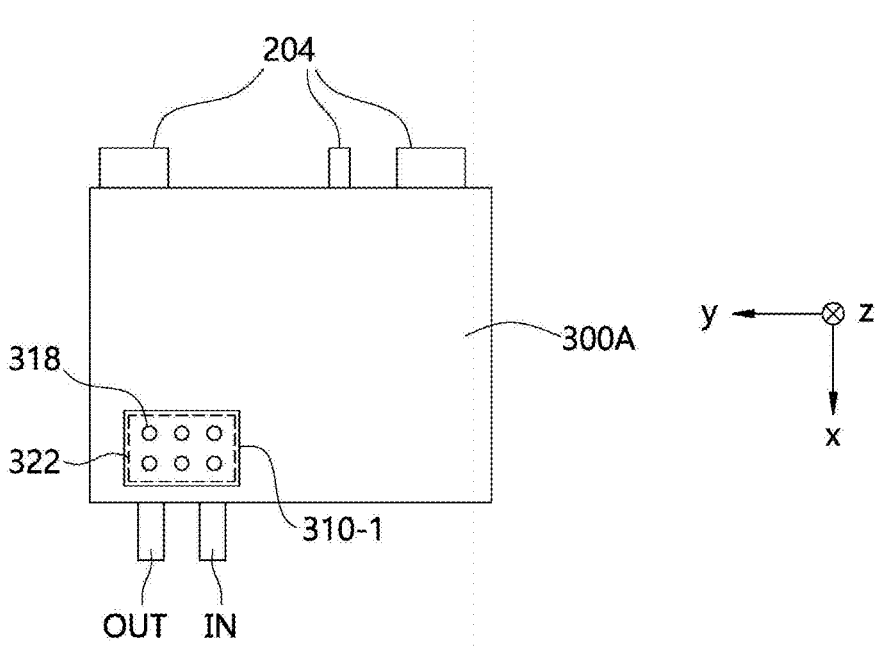
Figure 3A:
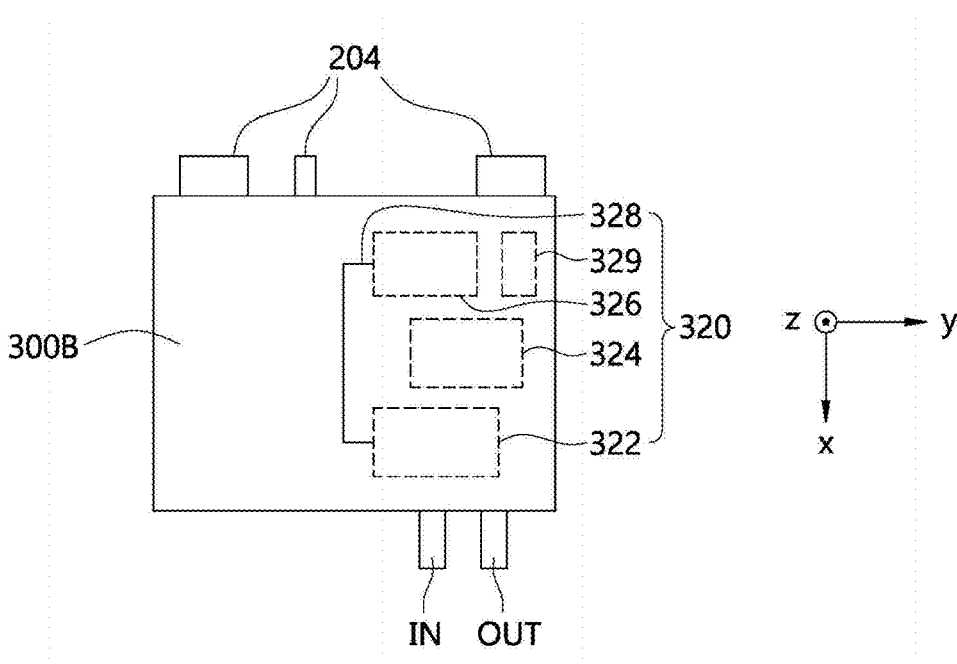
FIGS. 3A and 3B are respectively a plan view and a bottom view of a power distribution unit according to another embodiment.
Figure 3B:
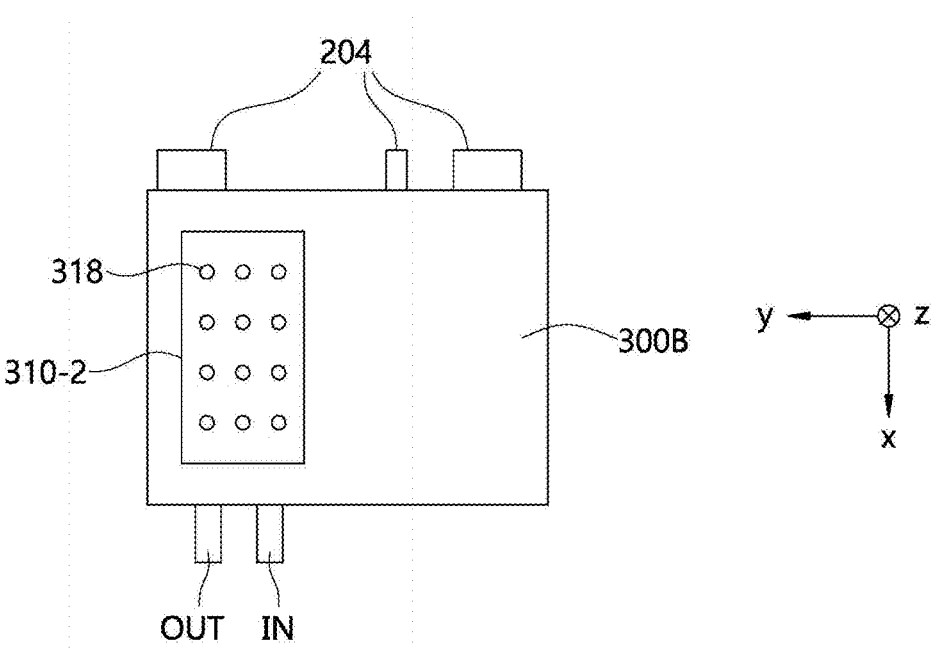

FIGS. 2A and 2B are respectively a plan view and a bottom view of a power distribution unit 300A according to an embodiment, and FIGS. 3A and 3B are respectively a plan view and a bottom view of a power distribution unit 300B according to another embodiment.

Each of the power distribution units 300A and 300B shown in FIGS. 2A to 3B corresponds to an embodiment of the power distribution unit 300 shown in FIG. 1, and the high-voltage connector terminal 204 shown in FIGS. 2A to 3B corresponds to the high-voltage connector terminal 204 shown in FIG. 1.

According to the embodiments, the power distribution unit 300 (300A or 300B) may include power parts 320 and a cooling unit 310 (310-1 or 310-2).

The power parts 320 may be parts included in the power distribution unit 300 (300A or 300B). The power parts 320 may include an electronic element 322, a switching unit 324 and 326, a wiring 328, and a bus bar 329. Although the power parts 320 are covered by a cover of the power distribution unit 300A or 300B and thus are invisible, they are indicated by dotted lines in FIGS. 2A and 3A for better understanding. In addition, although a cooling fin 318, which will be described later, is disposed in the cooling unit 310-1 or 310-2 and thus is invisible, illustration thereof is given in FIGS. 2B and 3B for better understanding.

The electronic element 322 may include a diode.

The switching unit may serve to selectively connect the fuel cell 120 to the power distribution unit 300 (300A or 300B) through the terminal block, and may include, for example, a relay element 324 and a fuse 326.

The bus bar 329 serves to connect the fuel cell 120 to the terminal block. In an example, the bus bar 329 may be directly connected to the terminal block by means of a bolt (not shown). That is, the power generated in the fuel cell 120 may be transmitted to the bus bar 329 through the terminal block.

The wiring may interconnect at least two of the electronic element 322, the switching unit 324 and 326, or the bus bar 329. In an example, the wiring 328 shown in FIG. 3A may electrically connect the diode 322 to the fuse 326.

The aforementioned power parts 320 may generate heat during operation thereof. For example, the bus bar 329 may reach a maximum temperature of 120° C. depending on the amount of current and time, and the diode 322 may also reach a similar temperature, e.g. a maximum temperature of 150° C.

The power distribution unit 300 (300A or 300B) according to the above-described embodiments may include a cooling unit 310 for removing heat generated from the power parts 320. At least some of the power parts 320 may generate heat, and the cooling unit 310 may serve to radiate the heat to the outside. For example, among the power parts 320, the electronic element 322, which is a diode, may generate the most heat, and the relay element 324, the fuse 326, the wiring 328, and the bus bar 329 may also generate heat.

Figure 4:
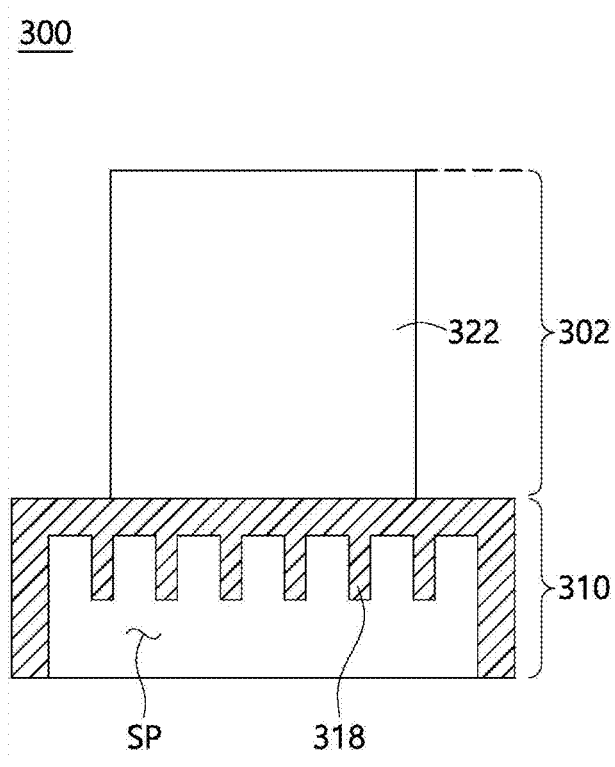
FIG. 4 is a cross-sectional view of an embodiment of the power distribution unit.

FIG. 4 is a cross-sectional view of an embodiment of the power distribution unit 300 (300A or 300B).

In order to cool the power parts 320, the cooling unit 310 may be disposed so as to be in contact with the power parts 320. For example, the power distribution unit 300 may include a main body (or a housing) 302, which accommodates the power parts 320, and the cooling unit 310, which is disposed on the lower end of the main body 302.

At least a portion of the cooling unit 310 may overlap the power parts 320 in the vertical direction (e.g. the z-axis direction).

According to one embodiment, the cooling unit 310-1 shown in FIGS. 2A and 2B may overlap only the diode 322 in the vertical direction. The reason for this is that the diode 322 generates the most heat from among the power parts 320.

According to another embodiment, the cooling unit 310-2 shown in FIGS. 3A and 3B may overlap the diode 322, the relay element 324, the fuse 326, the wiring 328, and the bus bar 329 in the vertical direction among the power parts 320. When it is intended to develop a fuel cell apparatus 100 suitable for use in a hot environment in which outdoor temperature is very high, the cooling unit 310-2 may be disposed as shown in FIG. 3B in order to cool as large an area of the power distribution unit 300 as possible.

In addition, the cooling unit 310 may include an inlet port IN and an outlet port OUT.

The inlet port IN is a portion into which cooling fluid is introduced from the outside, and the outlet port OUT is a portion through which cooling fluid that has cooled the power parts 320, i.e. cooling fluid that has absorbed heat generated from the power parts 320, is discharged to the outside. The cooling fluid introduced into the inlet port IN may flow through a space SP in the cooling unit 310, and may then be discharged to the outside through the outlet port OUT.

According to one embodiment, the cooling unit 310 may be of a water-cooling type. In this case, the cooling fluid may be coolant.

According to another embodiment, the cooling unit 310 may be of an air-cooling type. In this case, the cooling fluid may be cooling air. Here, the cooling air may correspond to air that is used to ventilate the interior of the fuel cell 120 (hereinafter referred to as "interior-ventilation air"). In this case, the fuel cell apparatus 100 may further include a cooling air passage 202, as shown in FIG. 1. The cooling air passage 202 may form a passage through which interior-ventilation air flows from the fuel cell 120 to the power distribution unit 300. The interior-ventilation air may be supplied to the power distribution unit 300 through the cooling air passage 202. In an example, as shown in FIG. 1, the cooling air passage 202 may be disposed outside the fuel cell 120 and the power distribution unit 300. In another example, the cooling air passage 202 may be disposed in the fuel cell 120 and the power distribution unit 300.

According to the embodiment, the inlet port IN and the outlet port OUT may be disposed so as to be oriented from the power distribution unit 300 in the same direction.

As shown in FIGS. 2A to 3B, the outlet port OUT and the inlet port IN may be disposed opposite the high-voltage connector terminal 204.

For example, as shown in FIG. 1, when the high-voltage connector terminal 204 is disposed so as to be oriented in the backward direction of the fuel cell apparatus 100, the outlet port OUT and the inlet port IN may be disposed so as to be oriented in the forward direction of the fuel cell apparatus 100.

Hereinafter, various embodiments 310A to 310I of the cooling unit 310 described above will be described with reference to the accompanying drawings.

FIGS. 5A to 5I are plan views of various embodiments 310A to 310I of the cooling unit 310.

The cooling unit 310 may include a main partition wall 312. The main partition wall 312 may be disposed so as to separate cooling fluid introduced into the cooling unit 310 through the inlet port IN and cooling fluid to be discharged through the outlet port OUT from each other. In an example, the main partition wall 312 may be disposed so as to extend in a first direction (e.g. the x-axis direction), which is parallel to the direction in which cooling fluid flows through the inlet port IN.

Figure 5A:
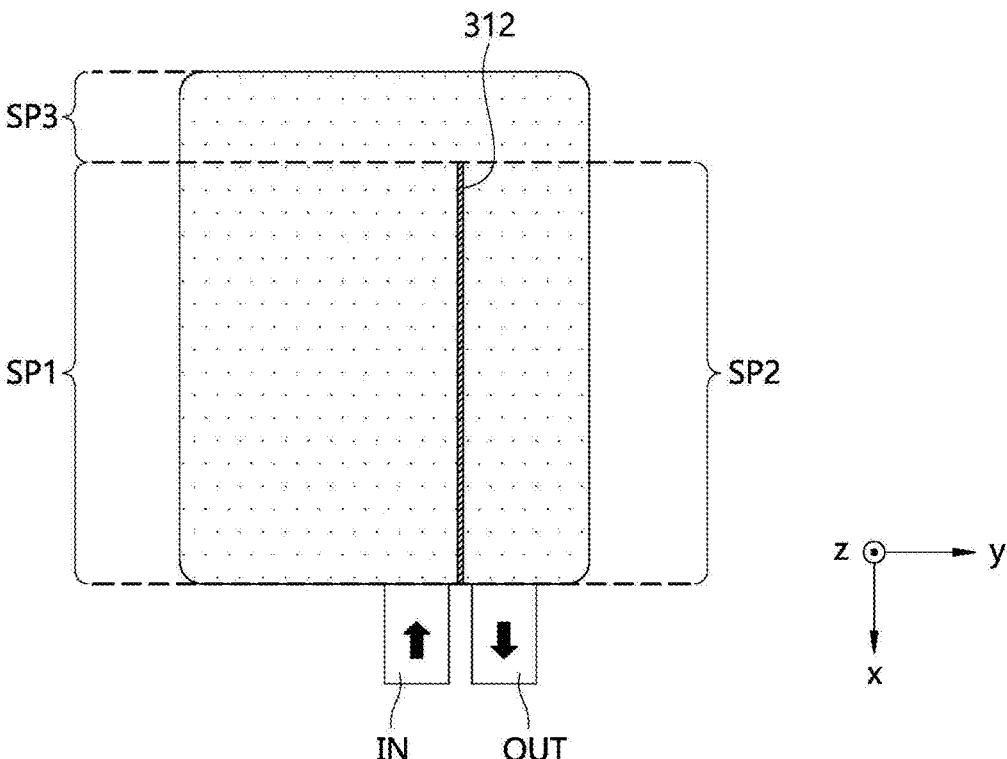
FIG. 5A is a plan view of an embodiment of a cooling unit.
Figure 5B:
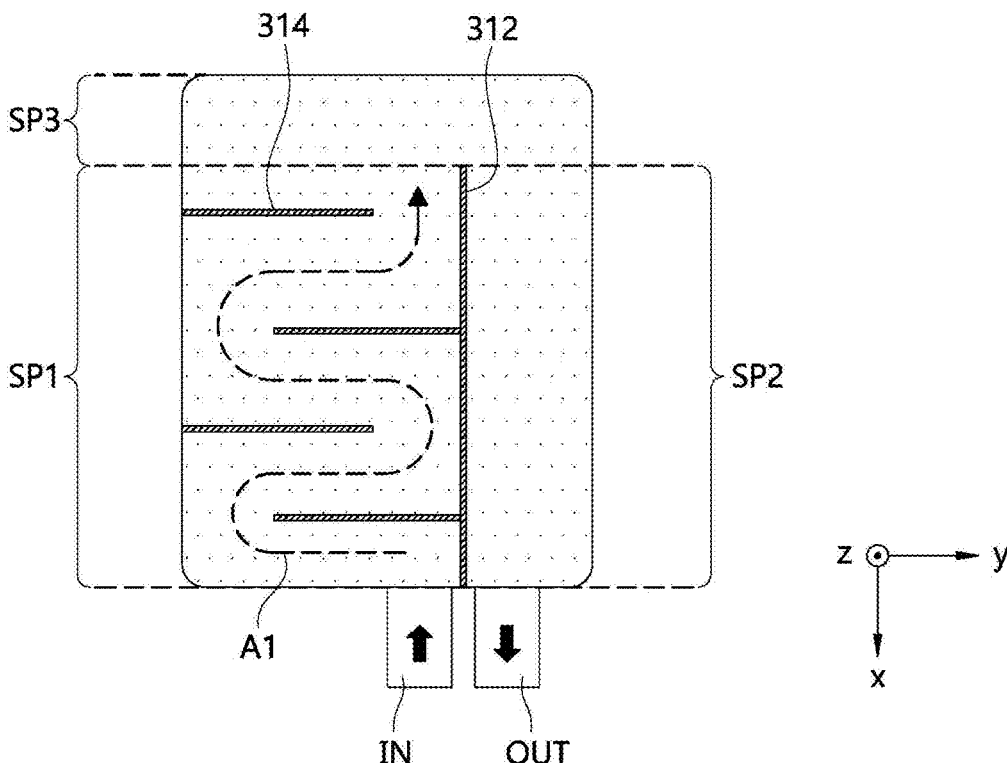
FIG. 5B is a plan view of another embodiment of the cooling unit.

The cooling unit 310 may include at least one from among first to third spaces SP (SP1, SP2, and SP3) defined by the main partition wall 312. For example, each of the cooling units 310A to 310F, 310H, and 310I shown in FIGS. 5A to 5F, 5H, and SI includes all of the first to third spaces SP1, SP2, and SP3, but the cooling unit 310G shown in FIG. 5G is not provided therein with the main partition wall 312, and thus the interior of the cooling unit 310G is not partitioned into the first to third spaces SP1, SP2, and SP3.

The first space SP1 may be defined as a space that is contiguous to the inlet port IN and allows the cooling fluid introduced into the inlet port IN to flow therethrough, and the second space SP2 may be defined as a space that is contiguous to the outlet port OUT and allows the cooling fluid to flow to the outlet port OUT. The first space SP1 and the second space SP2 may be separated from each other by the main partition wall 312.

The third space SP3 may be a space that forms a path through which the cooling fluid introduced into the first space SP1 through the inlet port IN moves to the second space SP2. That is, the third space SP3 corresponds to a space that interconnects the first space SP1 and the second space SP2, which are separated from each other by the main partition wall 312.

Heat may be radiated to the outside more rapidly from the regions of the power parts 320 that overlap the cooling unit 310 in the vertical direction than the regions thereof that do not overlap the cooling unit 310 in the vertical direction. In consideration thereof, the power parts 320 may overlap at least one of the first, second, or third space SP1, SP2, or SP3 in the vertical direction (e.g. the x-axis direction).

In addition, according to the embodiment, when the power parts 320 are disposed such that the area thereof overlapping the first space SP1 in the vertical direction is larger than that overlapping the second space SP2 in the vertical direction, the first space SP1 may be larger than the second space SP2.

In addition, according to the embodiment, the cooling unit 310 may further include sub-partition walls 314 and 316. The sub-partition walls 314 and 316 may be alternately disposed in a second direction (e.g. the y-axis direction), which intersects the first direction (e.g. the x-axis direction), thereby forming a path through which the cooling fluid flows in a serpentine shape together with the main partition wall 312.

According to the embodiment, the sub-partition walls may be disposed in at least one of the first space or the second space SP1 or SP2. For example, as shown in FIG. 5B or 5E, the sub-partition walls 314 may be disposed only in the first space SP1. Alternatively, as shown in FIG. 5C or 5F, the sub-partition walls 314 and 316 may be disposed in the second space SP2 as well as the first space SP1.

Figure 5C:
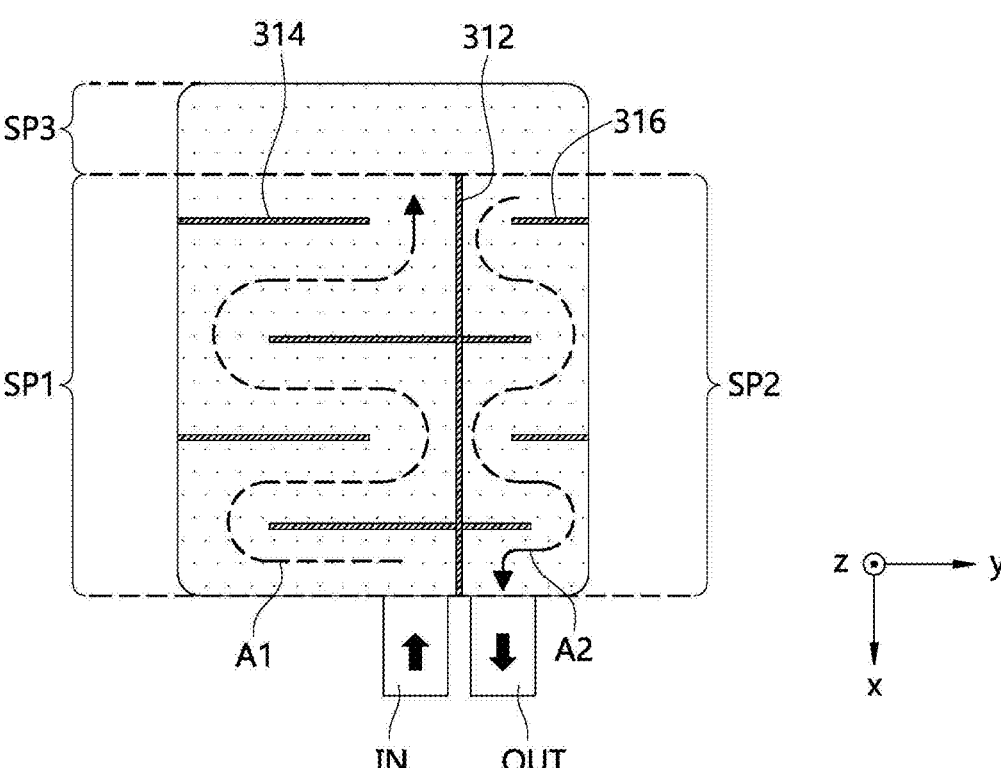
FIG. 5C is a plan view of still another embodiment of the cooling unit.

Accordingly, as shown in FIGS. 5B and 5C, when the sub-partition walls 314 are disposed in the first space SP1, the cooling fluid may flow through the first space SP1 in a serpentine shape, as indicated by the arrow A1. Thereafter, the cooling fluid may sequentially flow through the third space SP3 and the second space SP2, and may then be discharged through the outlet port OUT.

As shown in FIG. 5B, 5C, 5E, or 5F, when the path through which the cooling fluid flows is formed in a serpentine shape, the flow speed of the cooling fluid may be reduced, and thus a time for which the cooling fluid flows through the cooling unit 310 may be increased. Accordingly, the cooling fluid may absorb a sufficient amount of heat from the power distribution unit 300, and may then be discharged from the cooling unit 310.

The cooling unit may further include a propeller. The propeller serves to rotate the cooling fluid introduced into the cooling unit through the inlet port IN. The propeller causes the cooling fluid introduced into the cooling unit 310 through the inlet port IN to be circulated throughout the cooling unit 310. That is, the propeller may improve the flow of the cooling fluid.

According to the embodiment, the propeller may be disposed in at least one of the first, second, or third space SP1, SP2, or SP3.

In an example, the cooling unit 310G shown in FIG. 5G, which does not include the main partition wall 312, may further include a propeller 311, which is disposed at the center of the interior of the cooling unit 310G.

Figure 5D:
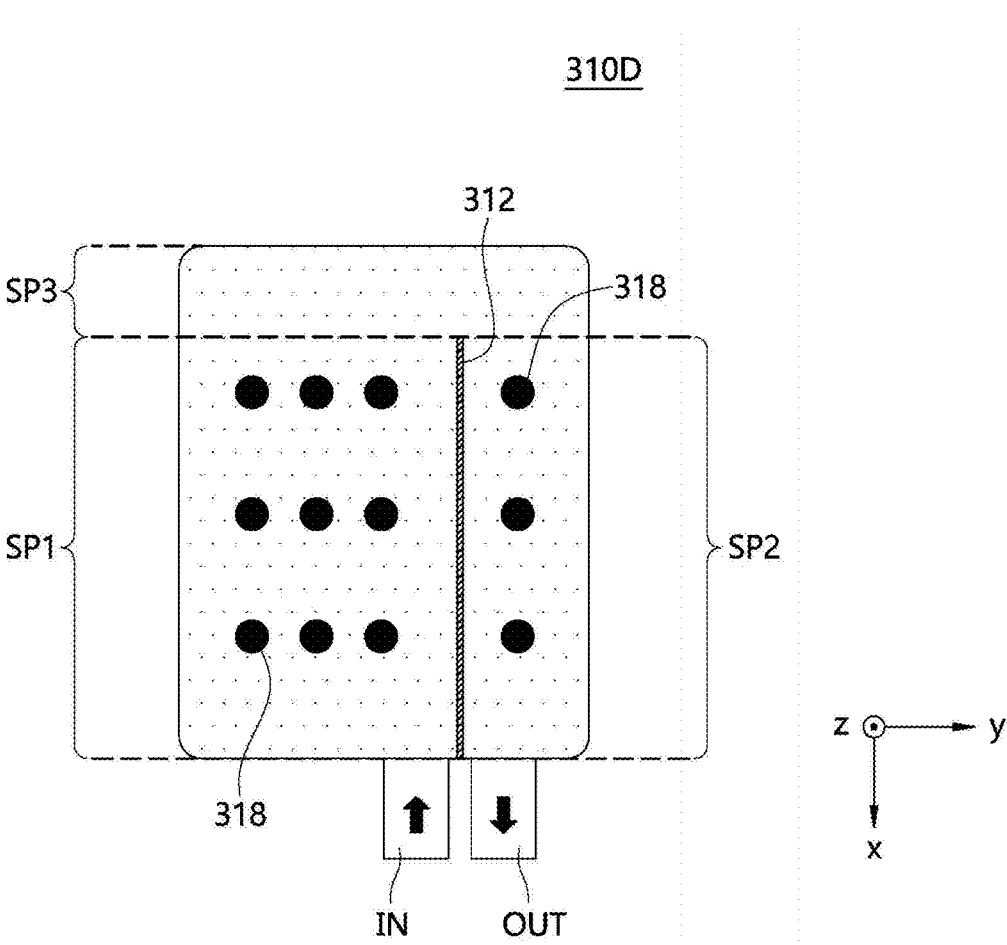
FIG. 5D is a plan view of still another embodiment of the cooling unit.
Figure 5E:
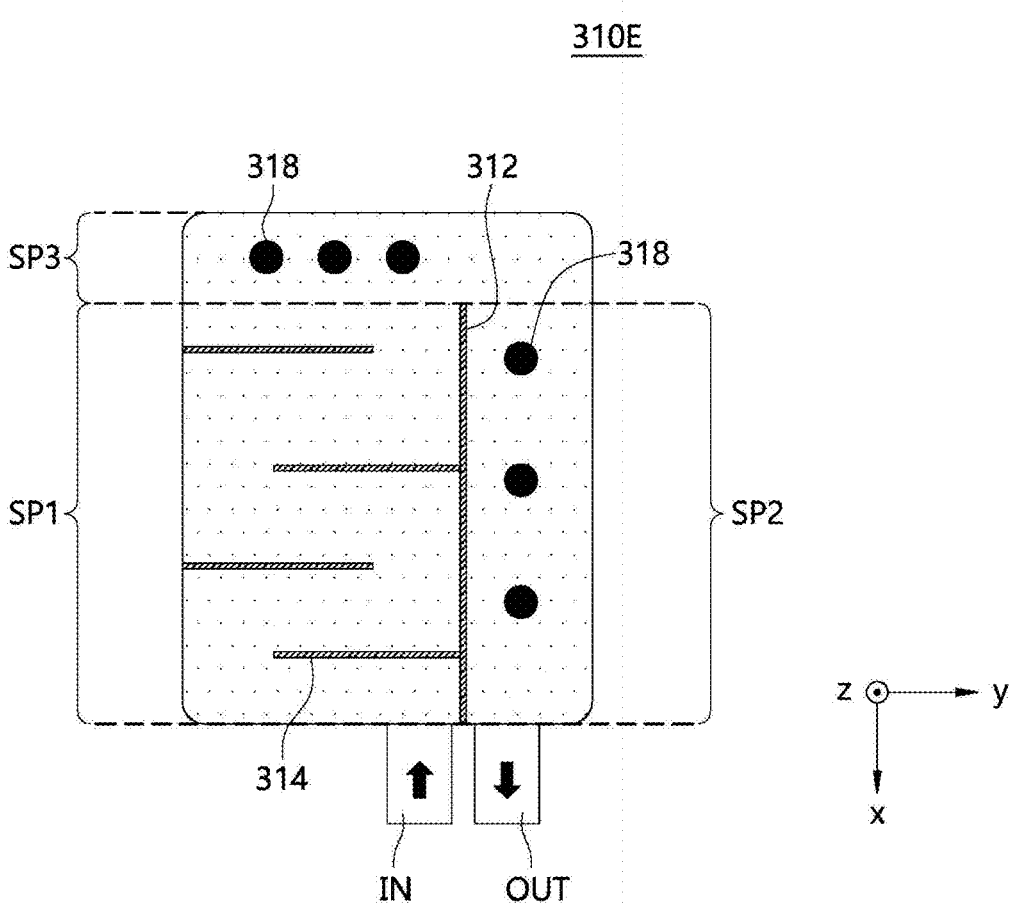
FIG. 5E is a plan view of still another embodiment of the cooling unit.
Figure 5F:
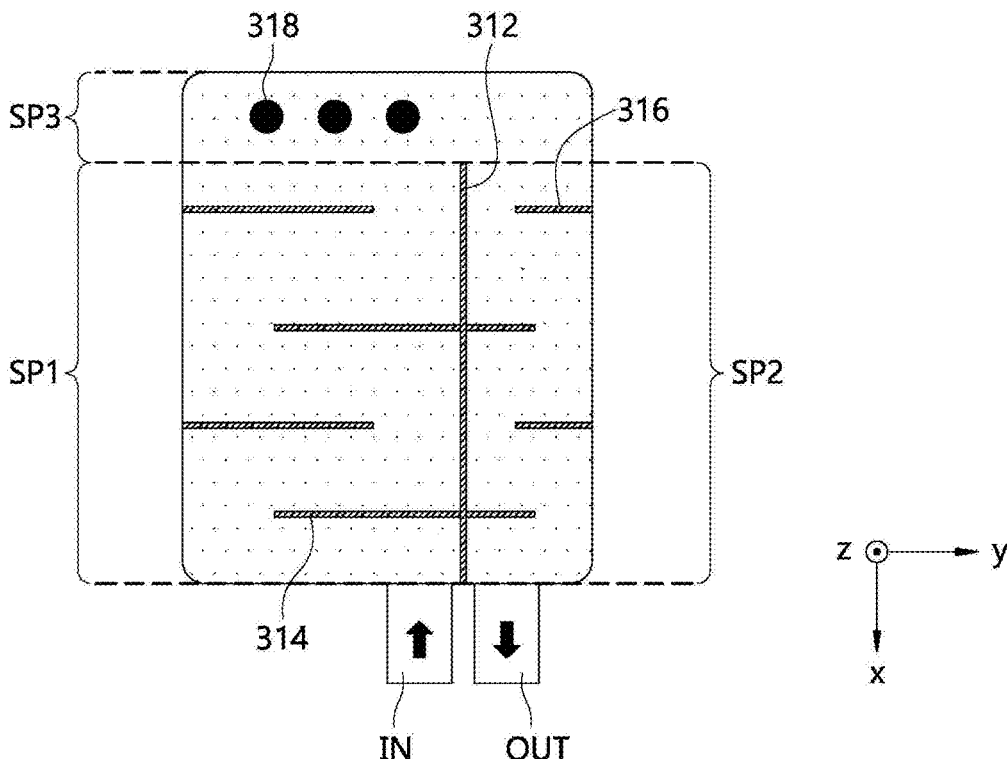
FIG. 5F is a plan view of still another embodiment of the cooling unit.
Figure 5G:
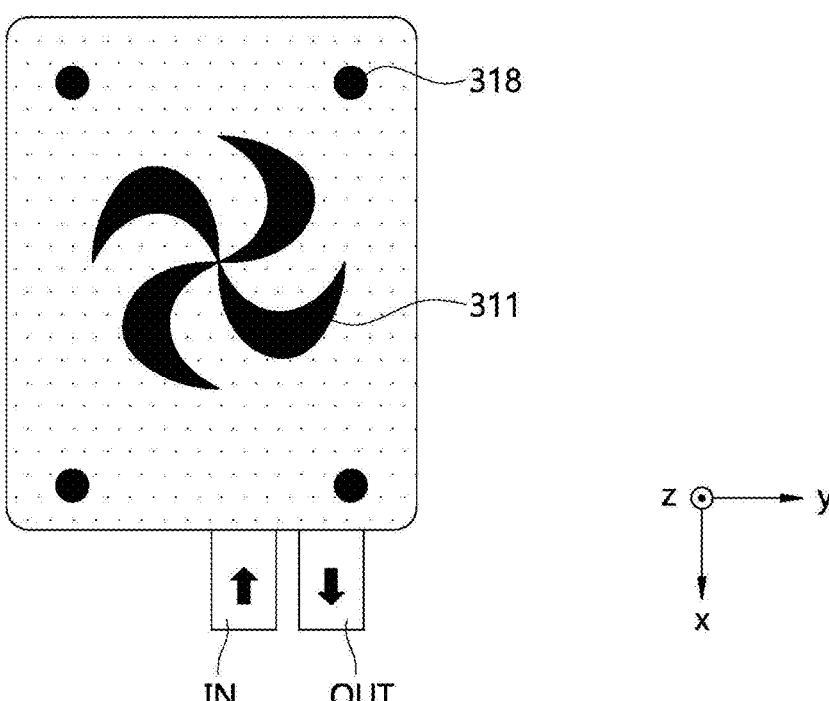
FIG. 5G is a plan view of still another embodiment of the cooling unit.
Figure 5H:
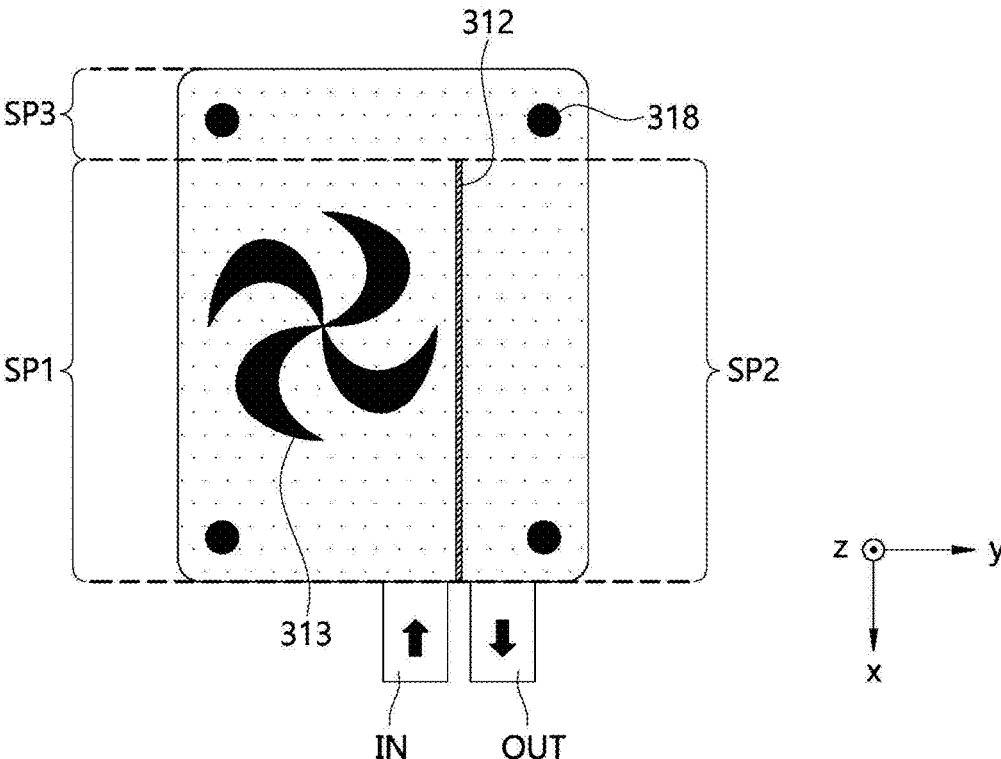
FIG. 5H is a plan view of still another embodiment of the cooling unit.

Alternatively, the cooling unit 310H shown in FIG. 5H, which includes the main partition wall 312, may include a propeller 313, which is disposed in the first space SP1.

Figure 5I:
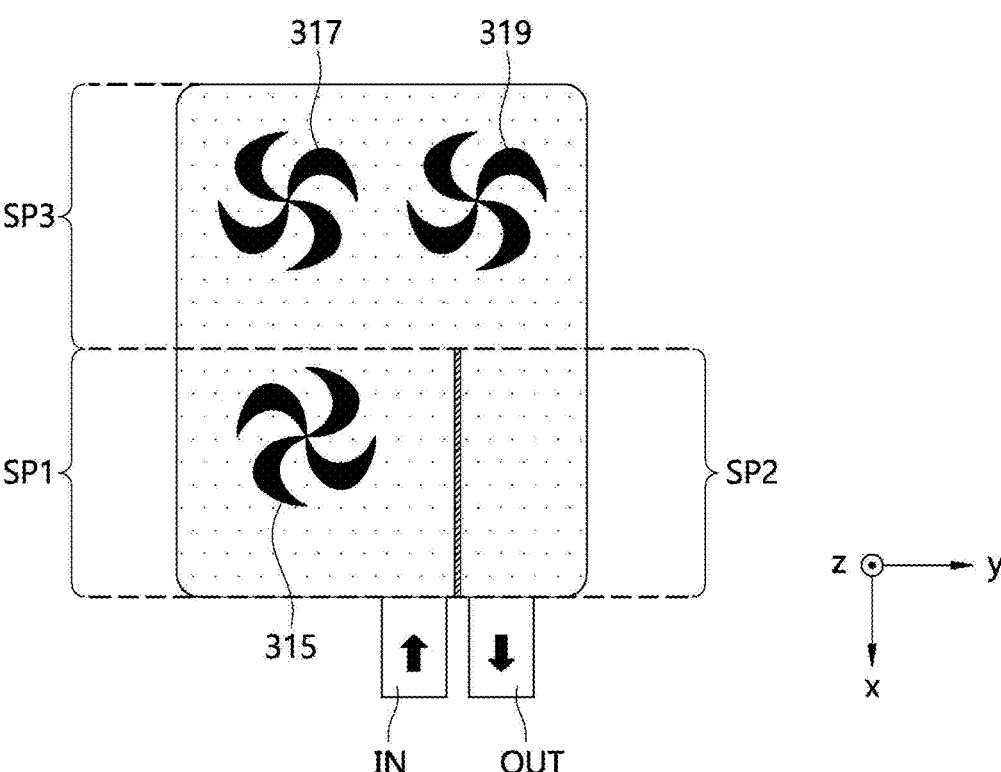
FIG. 5I is a plan view of still another embodiment of the cooling unit.

Alternatively, the cooling unit 310I shown in FIG. 5I, which includes the main partition wall 312, may further include a propeller 315, which is disposed in the first space SP1, and propellers 317 and 319, which are disposed in the third space SP3.

According to the embodiment, the cooling unit may further include a plurality of cooling fins 318. The cooling fins 318 may be disposed in the path through which the cooling fluid flows in at least one of the first, second, or third space SP1, SP2, or SP3.

As shown in FIG. 5D, the cooling fins 318 may be disposed in each of the first and second spaces SP1 and SP2.

As shown in FIG. 5E, the cooling fins 318 may be disposed in each of the second and third spaces SP2 and SP3. As shown in FIG. 5F, the cooling fins 318 may be disposed only in the third space SP3. As shown in FIG. 5G, the cooling fins 318 may be disposed around the propeller 311. As shown in FIG. 5H, the cooling fins 318 may be disposed in each of the first to third spaces SP1, SP2, and SP3.

In addition, according to the embodiment, the cooling unit may include a combination of at least two of the main partition wall 312, the sub-partition walls 314 and 316, the propellers 311, 313, 315, 317, and 319, or the cooling fins 318.

For example, each of the cooling units 310B and 310C shown in FIGS. 5B and 5C may include a combination of the main partition wall 312 and the sub-partition walls 314 and 316, the cooling unit 310D shown in FIG. 5D may include a combination of the main partition wall 312 and the cooling fins 318, each of the cooling units 310E and 310F shown in FIGS. 5E and 5F may include a combination of the main partition wall 312, the sub-partition walls 314 and 316, and the cooling fins 318, the cooling unit 310G shown in FIG. 5G may include a combination of the propeller 311 and the cooling fins 318, the cooling unit 310H shown in FIG. 5H may include a combination of the main partition wall 312, the propeller 313, and the cooling fins 318, and the cooling unit 310I shown in FIG. SI may include a combination of the main partition wall 312 and the propellers 315, 317, and 319.

According to the embodiment, the material of at least one of the main partition wall 312, the sub-partition walls 314 and 316, the propellers 311, 313, 315, 317, and 319, or the cooling fins 318 and the material of the body 302 of the cooling unit 310 may be the same as each other, for example metal, preferably aluminum. Particularly, the main partition wall 312 may be made of metal having excellent thermal conductivity. When the cooling unit 310 is of a water-cooling type, the main partition wall 312 may be made of metal not allowing elution of ions upon reaction with coolant.

Hereinafter, a comparative example and the fuel cell apparatus according to the embodiment will be described.

Figure 6A:
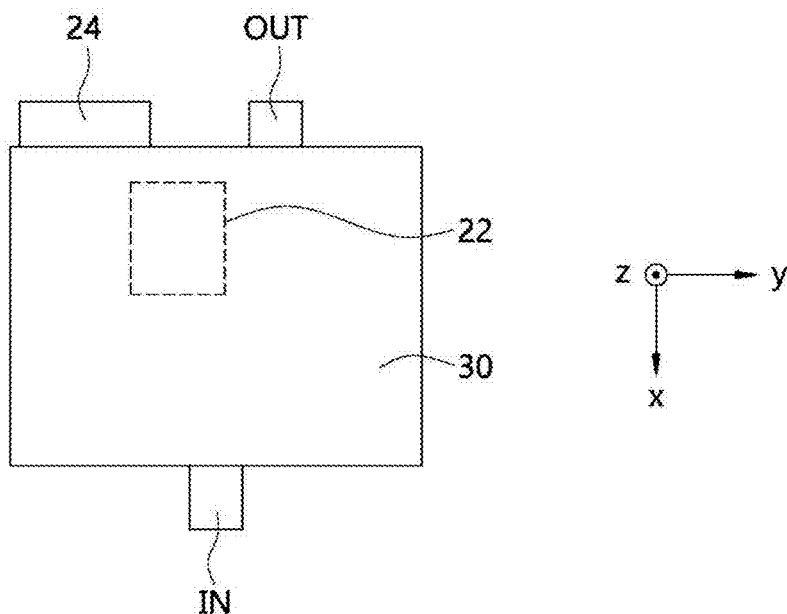
FIGS. 6A and 6B are respectively a plan view and a bottom view of a fuel cell apparatus according to a comparative example.
Figure 6B:
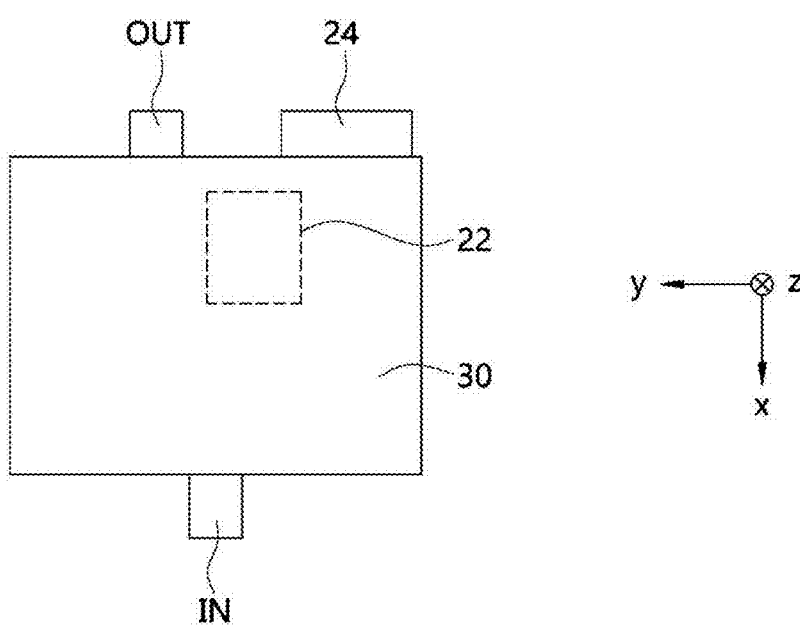

FIGS. 6A and 6B are respectively a plan view and a bottom view of a fuel cell apparatus according to a comparative example.

The fuel cell apparatus according to the comparative example may include a power distribution unit 30, a high-voltage connector terminal 24, and a cooling unit. The power distribution unit 30, the high-voltage connector terminal 24, and the cooling unit may respectively perform the same functions as the power distribution unit 300, the high-voltage connector terminal 204, and the cooling unit 310 according to the embodiment.

The power distribution unit 30 includes a diode 22, and the cooling unit 310 includes an inlet port IN and an outlet port OUT. The diode 22, the inlet port IN, and the outlet port OUT according to the comparative example respectively perform the same functions as the diode 322, the inlet port IN, and the outlet port OUT according to the embodiment.

In the comparative example, the inlet port IN and the outlet port OUT are disposed so as to be oriented in different directions. That is, the inlet port IN is disposed so as to be oriented in the +x-axis direction, and the outlet port OUT is disposed so as to be oriented in the −x-axis direction. The structure in which the inlet port IN and the outlet port OUT are disposed so as to be oriented in different directions allows coolant to flow throughout the power distribution unit 30 and thus ensures smooth flow of the coolant, but is disadvantageous in terms of workability. Further, when the fuel cell apparatus is a vehicle and the outlet port OUT, through which the coolant is discharged, is disposed adjacent to the high-voltage connector terminal 24, leakage of the coolant due to vibration or collision of the vehicle may cause an electric short-circuit. That is, the fuel cell apparatus according to the comparative example is very disadvantageous in terms of high-voltage stability.

In contrast, the inlet port IN and the outlet port OUT of the cooling unit 310 according to the embodiment are disposed so as to be oriented in the same direction. In this case, the inlet port IN and the outlet port OUT may be disposed opposite the high-voltage connector terminal 204. Since the outlet port OUT, through which the coolant is discharged, is disposed opposite the high-voltage connector terminal 204, even when the coolant leaks due to vibration or collision of the vehicle, the occurrence of an electric short-circuit may be prevented. That is, the fuel cell apparatus according to the embodiment is very advantageous in terms of high-voltage stability.

Particularly, according to the embodiment, when the fuel cell apparatus 100 is a vehicle and the inlet port IN and the outlet port OUT are disposed so as to be oriented in the same direction, e.g. the forward direction of the fuel cell vehicle, it may be possible to minimize an unnecessary portion of the package and to facilitate assembly and repair/maintenance of the power distribution unit 300 after mounting thereof in the vehicle, thereby improving workability.

Figure 7:
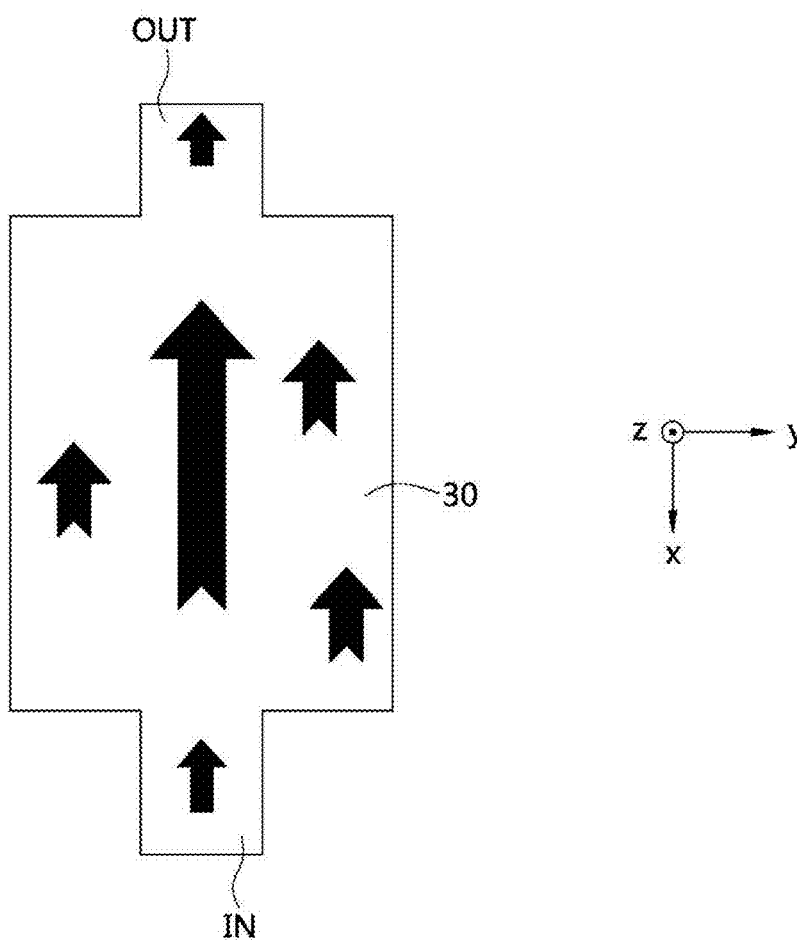
FIG. 7 is a view for explaining the flow of coolant in a power distribution unit according to the comparative example.
Figure 8:
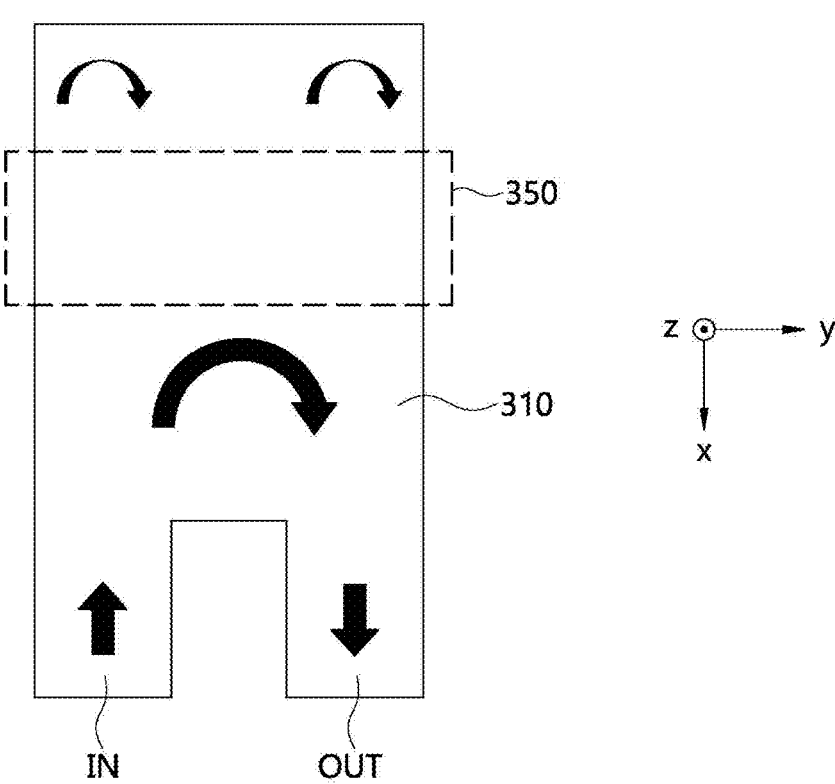
FIG. 8 is a view for explaining the flow of coolant in the cooling unit according to the embodiment.

FIG. 7 is a view for explaining the flow of coolant in the power distribution unit 30 according to the comparative example, and FIG. 8 is a view for explaining the flow of coolant in the cooling unit 310 according to the embodiment.

The power distribution unit 30 shown in FIG. 7 corresponds to the power distribution unit 30 shown in FIGS. 6A and 6B.

Referring to FIG. 7, when the inlet port IN and the outlet port OUT are disposed so as to be oriented in directions opposite each other, the coolant introduced into the inlet port IN may smoothly flow through the power distribution unit 30 without remaining and may be discharged through the outlet port OUT, as indicated by the arrows.

However, as shown in FIG. 8, when the inlet port IN and the outlet port OUT are disposed so as to be oriented in the same direction, a portion of the coolant introduced through the inlet port IN may swirl or remain in a region 350 in the cooling unit 310.

Figure 9:
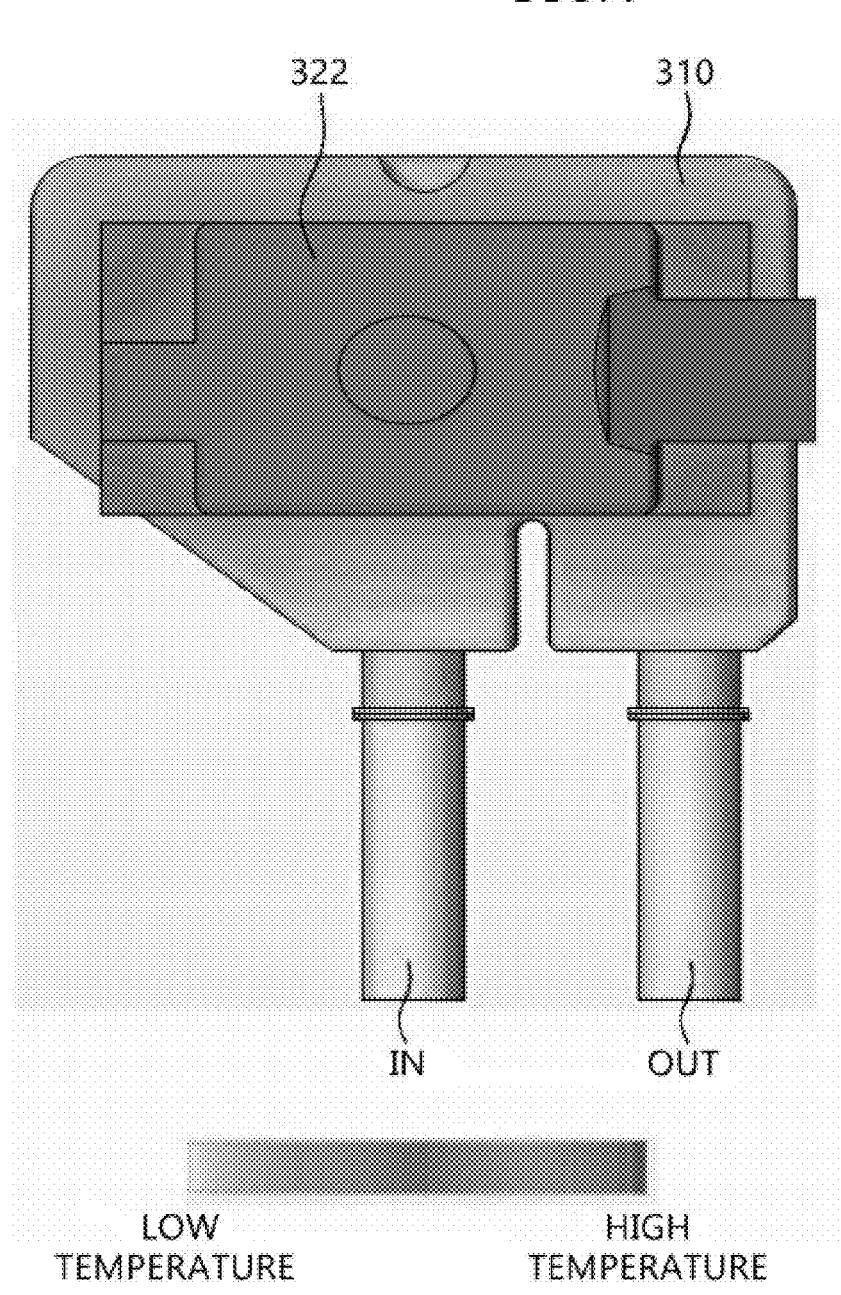
FIG. 9 shows heat temperature distribution of the cooling unit according to the embodiment.
Figure 9:
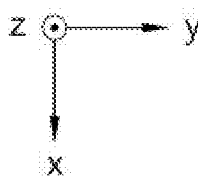
Figure 10:
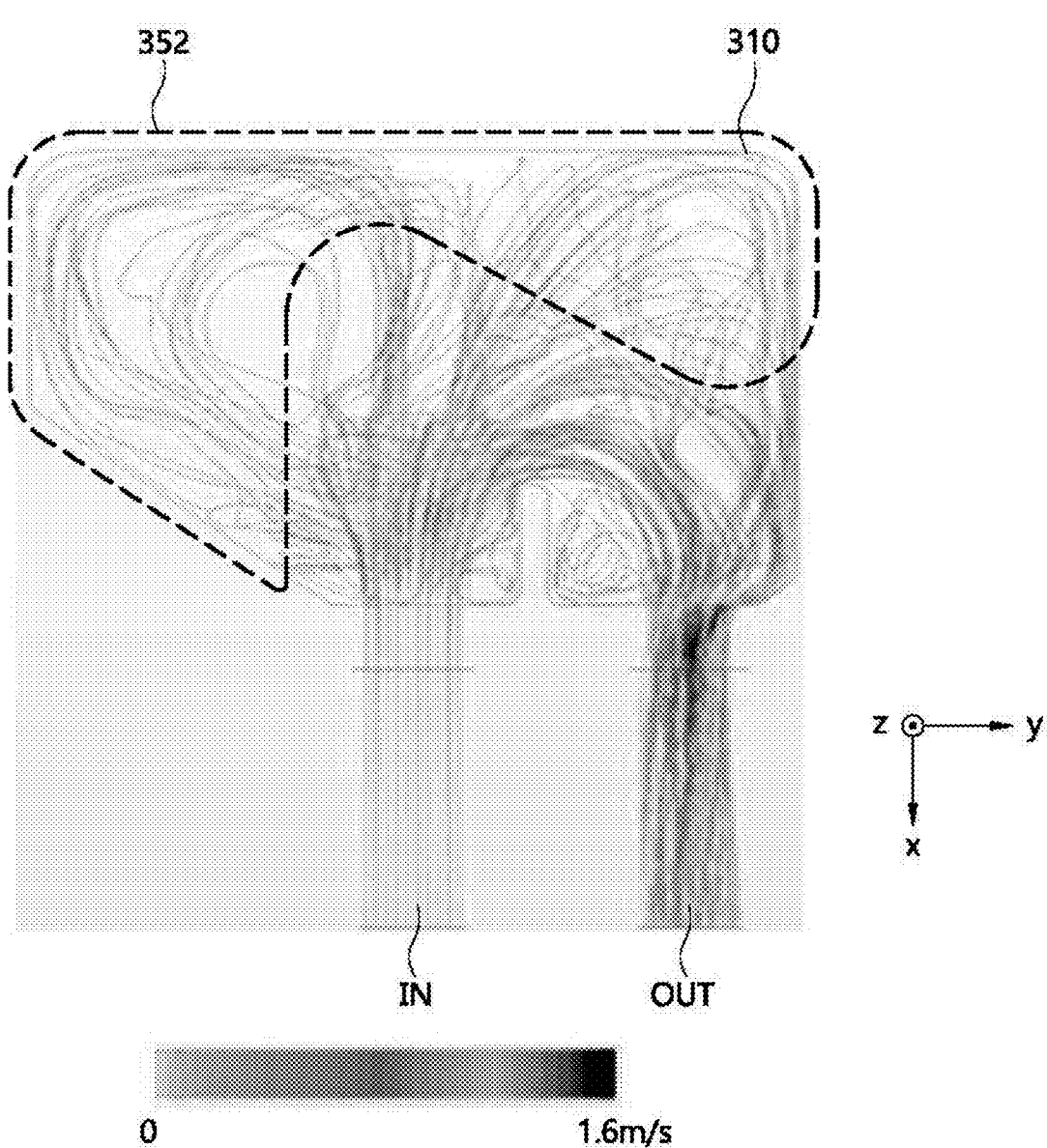
FIG. 10 shows flow distribution of coolant in the cooling unit shown in FIG. 9.

FIG. 9 shows heat temperature distribution of the cooling unit 310 according to the embodiment, and FIG. 10 shows flow distribution of the coolant in the cooling unit 310 shown in FIG. 9.

Although the diode 322 shown in FIG. 9 generates a great amount of heat, a portion of the coolant may swirl or remain in the cooling unit 310, as described above with reference to FIG. 8, and accordingly, the flow of the coolant may be concentrated in the middle of the coolant path, the inlet port IN, and the outlet port OUT, and a portion of the coolant may remain in a region 352 without flowing, as shown in FIG. 10. Further, most of the coolant introduced through the inlet port IN may gather in the middle of the coolant path, and may then be directly discharged through the outlet port OUT. That is, the coolant may flow through only a portion of the coolant path in the cooling unit 310, rather than flowing throughout the coolant path. Therefore, the cooling efficiency obtained by a given amount of coolant may be lowered, and thus the entire area of the power distribution unit 300 may not be evenly cooled. As a result, the cooling performance of the fuel cell apparatus 100 during operation thereof may be deteriorated.

In order to solve the above problems, according to the embodiment, at least one of the main partition wall 312, the sub-partition walls 314 and 316, the propellers 311, 313, 315, 317, and 319, or the cooling fins 318 is disposed in the cooling unit 310, thereby preventing a portion of the cooling fluid from swirling or remaining in the cooling unit 310. Accordingly, the cooling unit 310 according to the embodiment may evenly cool the entire area of the power distribution unit 300.

In addition, in the case in which the cooling fins 318 are disposed, the area of contact between the cooling fluid and the metal (e.g. the cooling fins 318 or the partition walls 312, 314, or 316) may be increased, and accordingly, cooling efficiency may be further improved.

In addition, in the case in which the main partition wall 312 is disposed, it may be possible to prevent most of the coolant introduced through the inlet port IN from gathering in the middle of the coolant path and being directly discharged through the outlet port OUT as shown in FIG. 8. In addition, the cooling surface may be increased, and accordingly, the cooling efficiency may be further improved.

In addition, in the case in which the sub-partition walls 314 and 316 are disposed, a time for which the cooling fluid flows through the coolant path in the cooling unit 310 may be increased. Accordingly, the cooling fluid may absorb a sufficient amount of heat from the power parts 320, and thus the cooling efficiency may be maximized.

In addition, even when the cooling unit 310G does not include the main partition wall 312 or the sub-partition walls 314 and 316, it may be possible to improve poor flow of the cooling fluid (refer to FIG. 8) using the propeller 311 shown in FIG. 5G.

In general, the temperature (e.g. 75° C.) of the cooling fluid present in the first space SP1 is lower than the temperature (e.g. 85° C.) of the cooling fluid present in the second space SP2. Therefore, in the case in which the main partition wall 312 is disposed such that the first space SP1 is larger than the second space SP2 and in which the power parts 320 are disposed such that the regions thereof overlapping the first space SP1 in the vertical direction are larger than those overlapping the second space SP2 in the vertical direction, the power parts 320 may be more effectively cooled, and thus the cooling efficiency may be further improved compared to the case in which the power parts 320 are disposed such that the regions thereof overlapping the second space SP2 in the vertical direction are larger than those overlapping the first space SP1 in the vertical direction.

As a result, in the fuel cell apparatus according to the embodiment, the entire area of the power distribution unit 300 may be evenly cooled, and thus the cooling performance may be improved. Accordingly, it may be possible to effectively minimize or prevent increase in the temperature of the power parts 320, thus preventing generation of high temperature in the power distribution unit 300 and thermal damage to the power parts 320 due to heat (e.g. preventing malfunction of the power parts 320 due to fusion or melting). As a result, deterioration in the performance of the power parts 320 due to degradation thereof may be prevented, and the lifespan of the power distribution unit 300 may be increased. In addition, since damage to the power parts 320 included in the power distribution unit 300 is minimized, it may be possible to protect an operator of the fuel cell apparatus and the operator's surrounding environment, e.g. a cell stack and an engine compartment of a vehicle.

The fuel cell apparatus according to the embodiment described above may be applied to vehicles, aircraft, vessels, stationary power generation systems, and the like. However, the embodiments are not limited thereto.

As is apparent from the above description, the fuel cell apparatus according to the embodiment may have improved cooling performance by enabling the entire area of the power distribution unit to be evenly cooled, thereby effectively minimizing or preventing increase in the temperature of the power parts and thus preventing generation of high temperature in the power distribution unit and thermal damage to the power parts due to heat. As a result, deterioration in the performance of the power parts due to degradation thereof may be prevented, and the lifespan of the power distribution unit may be increased. In addition, since damage to the power parts included in the power distribution unit is minimized, it may be possible to protect an operator of the fuel cell apparatus and the operator's surrounding environment, e.g. a cell stack. Particularly, when the fuel cell apparatus is a vehicle, it may be possible to protect an engine compartment of the vehicle.

However, the effects achievable through the disclosure are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell apparatus, comprising:
a fuel cell; and
a power distribution unit configured to distribute power generated in the fuel cell,
the power distribution unit comprising:
a power part; and
a cooling unit disposed in contact with the power part to cool the power part, the cooling unit comprising:
an inlet port configured to allow cooling fluid to be introduced thereinto from an outside; and
an outlet port configured to discharge the cooling fluid to the outside,
wherein the inlet port and the outlet port are oriented from the power distribution unit in a same direction, and
wherein the cooling unit further comprises a main partition wall disposed so as to separate the cooling fluid introduced through the inlet port and the cooling fluid to be discharged through the outlet port from each other.

2. The fuel cell apparatus according to claim 1, further comprising:

a high-voltage connector terminal connected to the power distribution unit, wherein the outlet port and the inlet port are located opposite the high-voltage connector terminal.

3. The fuel cell apparatus according to claim 2, wherein the high-voltage connector terminal is disposed so as to be oriented from the power distribution unit in a direction opposite to a direction in which the outlet port and the inlet port are oriented.

4. The fuel cell apparatus according to claim 1, wherein the power part comprises:

an electronic element comprising a diode;

a switching unit selectively connecting the fuel cell to the power distribution unit through a terminal block;

a bus bar connecting the fuel cell to the terminal block; and a wiring interconnecting at least two of the electronic element, the switching unit, or the bus bar.

5. The fuel cell apparatus according to claim 4, wherein at least a portion of the cooling unit overlaps the power part in a vertical direction.

6. The fuel cell apparatus according to claim 1, wherein the cooling fluid is coolant or cooling air.

7. The fuel cell apparatus according to claim 1, wherein the cooling unit comprises:

a first space allowing the cooling fluid introduced into the inlet port to flow therethrough;

a second space allowing the cooling fluid to flow therethrough and to be discharged through the outlet port, the second space being separated from the first space by the main partition wall; and a third space forming a path allowing the cooling fluid to move from the first space to the second space.

8. The fuel cell apparatus according to claim 7, wherein the power part overlaps the first space and the second space in a vertical direction such that a region thereof overlapping the first space is larger than a region thereof overlapping the second space.

9. The fuel cell apparatus according to claim 8, wherein the first space is larger than the second space.

10. The fuel cell apparatus according to claim 7, wherein the main partition wall extends in a first direction, the first direction being parallel to an inflow direction of the cooling fluid into the inlet port.

11. The fuel cell apparatus according to claim 10, wherein the cooling unit further comprises sub-partition walls alternately disposed in a second direction to form a cooling fluid path in a serpentine shape together with the main partition wall, the second direction being a direction intersecting the first direction.

12. The fuel cell apparatus according to claim 11, wherein the sub-partition walls are disposed in at least one of the first space or the second space.

13. The fuel cell apparatus according to claim 7, wherein the cooling unit further comprises a propeller disposed in at least one of the first space, the second space, or the third space to rotate the cooling fluid introduced thereinto through the inlet port.

14. The fuel cell apparatus according to claim 13, wherein the cooling unit further comprises a plurality of cooling fins disposed in a cooling fluid path in at least one of the first space, the second space, or the third space.

15. The fuel cell apparatus according to claim 11, wherein the cooling unit further comprises a propeller disposed in at least one of the first space, the second space, or the third space to rotate the cooling fluid introduced thereinto through the inlet port.

16. The fuel cell apparatus according to claim 15, wherein the cooling unit further comprises a plurality of cooling fins disposed in a cooling fluid path in at least one of the first space, the second space, or the third space.

17. The fuel cell apparatus according to claim 1, wherein the power distribution unit further comprises a main body accommodating the power part, and wherein the cooling unit is disposed on a lower end of the main body.

18. The fuel cell apparatus according to claim 1, wherein the inlet port and the outlet port are disposed adjacent to each other.

19. A vehicle comprising the fuel cell apparatus according to claim 1.

* * * * *